United States Patent [19]

Kamiya et al.

[11] Patent Number: 5,135,904
[45] Date of Patent: Aug. 4, 1992

[54] ADSORBENT COMPOSITION FOR MALODOROUS GASES

[75] Inventors: Kazuo Kamiya, Tokyo; Motohiro Suzuki, Osaka; Yukio Nagai, Sakai; Mitsutomo Tsuhako, Nishinomiya; Masaki Kobayashi, Takarazuka, all of Japan

[73] Assignee: Tayca Corporation, Osaka, Japan

[21] Appl. No.: 601,646

[22] Filed: Oct. 23, 1990

Related U.S. Application Data

[63] Continuation-in-part of Ser. No. 305,818, Feb. 3, 1989, abandoned.

[30] Foreign Application Priority Data

Feb. 5, 1988 [JP] Japan .................................. 63-26447
May 24, 1988 [JP] Japan ................................ 63-126154

[51] Int. Cl.$^5$ ........................ B01J 20/26; B01J 20/06; B01J 20/30; C01G 9/02
[52] U.S. Cl. ....................................... 502/402; 55/73; 55/74; 423/622; 502/400; 502/414

[58] Field of Search ............... 502/400, 402, 414, 415, 502/208, 343, 159; 423/104, 622; 55/73

[56] References Cited

U.S. PATENT DOCUMENTS

| | | | |
|---|---|---|---|
| 3,453,072 | 7/1969 | Vian-Ortuno et al. | 423/104 |
| 3,801,704 | 4/1974 | Kobayashi et al. | 423/309 |
| 4,665,050 | 5/1987 | Degen et al. | 502/402 |

FOREIGN PATENT DOCUMENTS

0211560  2/1987  European Pat. Off. ................ 55/73

Primary Examiner—Paul E. Konopka
Attorney, Agent, or Firm—Millen, White & Zelano

[57] ABSTRACT

A zinc oxide-hydroxide complex produced by heating freshly prepared zinc hydroxide at a temperature from about 150° C. to about 450° C. is useful as an adsorbent for malodorous gases such as hydrogen sulfide, mercaptans and the like. The complex alone or its combination with aluminum dihydrogen tripolyphosphate may be incorporated into a synthetic thermoplastic resin for fabricating shaped plastic articles for deodorant uses.

9 Claims, No Drawings

ADSORBENT COMPOSITION FOR MALODOROUS GASES

RELATED APPLICATION

This application is a continuation-in-part of our earlier application Ser. No. 305,818, filed Feb. 3, 1989, now abandoned.

BACKGROUND OF THE INVENTION

This invention relates to an adsorbent composition for malodorous gases such as hydrogen sulfide, mercaptans and other gaseous malodorous substances.

Heretofore, various compositions have been known and used for selectively adsorbing malodorous gases such as hydrogen sulfide, mercaptans and other acidic malodorous gases. They include ferric hydroxide, ferric sulfate, zeolite, activated carbon and the like. These known deodorant compositions are generally dark in color or darken when adsorbing sulfur-containing gases such as hydrogen sulfide. Accordingly, their use is limited to those cases where the dark color is acceptable. Some of the known adsorbents such as zeolite are bright in color but their capability of adsorbing malodorants is relatively weak.

Thus, needs exist for an adsorbent composition for malodorous gases which is bright in color and exhibits high capability of selectively adsorbing such malodorous gases.

BRIEF SUMMARY OF THE INVENTION

According to the present invention, there is provided an adsorbent composition for malodorous gases comprising a zinc oxide-hydroxide complex produced by heating zinc hydroxide at a temperature from about 150° C. to about 450° C.

The above zinc oxide-hydroxide complex is bright in color and capable of efficiently adsorbing a variety of malodorous gases such as hydrogen sulfide, mercaptans and other acidic malodorous gases.

The present invention also provides an adsorbent composition for malodorous gases comprising said zinc oxide-hydroxide complex in admixture with aluminum dihydrogen tripolyphosphate. This composition is also bright in color and capable of efficiently adsorbing, in addition to acidic malodorous gases, a variety of basic malodorous gases such as ammonia.

The zinc oxide-hydroxide complex is stable in the atmosphere and at elevated temperatures. Accordingly, it may be blended into a suitable matrix resin by kneading the zinc oxide-hydroxide complex alone or in combination with aluminum dihydrogen tripolyphosphate and a molten thermoplastic resin such as polyethylene, polypropylene, polyvinyl chloride, polystyrene, polyethyleneterephthalate, polyacrylonitrile, polymethylmethacrylate and the like. The resulting blend may be shaped into any convenient form such as granules, sheets, films, fibers and the like for deodorant uses.

DETAILED DESCRIPTION OF THE INVENTION

Zinc hydroxide may be produced, as is wellknown, by reacting a water-soluble zinc salt with an alkali. As a zinc salt, chloride, sulfate, nitrate and mixtures of these salts may be mentioned. As an alkali, sodium hydroxide, potassium hydroxide, lithium hydroxide and mixtures thereof may be mentioned. Aqueous solutions of ammonia, spent alkali or ammonium solutions used for cleaning discharge gases may also be used as alkali. The reaction may be carried out by gradually adding an aqueous solution of alkali into an aqueous solution of zinc salt with stirring. Preferably, the ratio of the alkali to the zinc salt is substantially stoichiometric. In other words, about 1.6 to 2.4 moles of hydroxide ions are used per mole of zinc ions. The final pH of the reaction mixture lies between 6 and 12, preferably between 6 and 8. Because of amphoteric nature of zinc hydroxide, excessive alkalinity should be avoided to prevent the hydroxide from redissolving in the reaction mixture as zinc acid ions.

The resulting precipitate is recovered by filtration and washed with water. Several polymorphs of zinc hydroxide are known. It has been reported in the literature that they are unstable and converted to zinc oxide at a temperature above 125° C. In our experiments, it was demonstrated in the X-ray diffraction that heating the zinc hydroxide gave an oxide-hydroxide complex at a temperature between 100° C. and 450° C. while oxide was the main product at a temperature above 500° C.

It was then discovered that the zinc oxide-hydroxide complex thus formed has a greater specific surface area than zinc oxide or zinc hydroxide and is useful as a selective adsorbent of acidic malodorous gases. The adsorbability of malodorous gases may be maximized by heating the zinc hydroxide at a temperature between 200° C. and 400° C. for a length of time sufficient to reach a constant weight. The surface area of the zinc oxide-hydroxide complex is greater than 5 m$^2$/g.

The complex thus produced is white, does not darken when adsorbing, for example, hydrogen sulfide, and is stable in the atmosphere and against heat. These beneficial properties make the complex useful as a deodorant composition in admixture with plastics.

The adsorbability of malodorous gases possessed by the zinc oxide-hydroxide complex is far greater than zinc oxide or zinc hydroxide alone or their blends. Although it is not intended to be bound to a particular theory, it is believed that this is because the complex is more active as a solid base than simple oxide or hydroxide.

In a further embodiment of the invention, the zinc oxide-hydroxide complex is admixed with aluminum dihydrogen tripolyphosphate to provide an adsorbent composition of both acidic and basic malodorous gases.

Aluminum dihydrogen tripolyphosphate is known as a solid acid capable of adsorbing basic malodorous gases such as ammonia and amines. Because of its bright color, the composite deodorant composition is also bright. It is known that aluminum dihydrogen Tripolyphosphate occurs as dihydrate and anhydride. For blending with a molten matrix resin in admixture with the zinc oxide-hydroxide complex, the anhydride is preferable. Aluminium dihydrogen tripolyphosphate may be produced, for example, by the method disclosed in U.S. Pat. No. 3,801,704. Thus, a mixture of Al$_2$O$_3$ source and P$_2$O$_5$ source at a P$_2$O$_5$:Al$_2$O$_3$ molar ratio of 1:1 to 6:1 is heated at a temperature of 300° C. to 450° C. to obtain an opaque semisolid product, which is then reheated at a temperature of 300° C. to 450° C. to dehydrate and crystallize as aluminum dihydrogen tripolyphosphate. The anhydrous product may be obtained by adjusting the water content of the product of the first heating step at 10 to 15%. The proportion of aluminum dihydrogen tripolyphosphate relative to the zinc oxide-hydroxide complex may vary in a wide range depending upon the nature of the malodorous gases and their relative concentrations. Usually the ratio of the zinc oxide-hydroxide complex to aluminum dihydrogen tripolyphosphate ranges between 90:10 and 10:90, preferably between 75:25 and 25:75 by weight.

The deodorant composition may be blended with a variety of synthetic resins such as polyethylene, polypropylene, polyinyl chloride, polystyrene, polyethyleneterephthalate, polyacrylonitrile, polymethylmethacrylate and the like. Usually 0.5 to 20% by weight of the resin of the deodorant composition is blended. The resulting blend may be shaped into granules, films, fibers and other desired forms. Foam products may be produced by impregnating the blend with liquid propane or butane and then heating in a closed mold. Before blending with the molten matrix resin, the zinc oxide-hydroxide complex and aluminum dihydrogen tripolyphosphate are preferably pulverized and sieved to a maximum particle size of no greater than 5 microns. The blending process may be performed using any conventional equipment such as extruders, kneaders and the like. The shaping process may also be performed using a variety of conventional equipments depending upon the particular forms to which the blend is to be shaped. These include extruders, calenders, spinners, inflation molds, vacuum molds, injection molds, presses and the like. The products may be colored by incorporation of a suitable pigment to the blend or by dyeing fiber products. Shaped plastic materials may be used as a deodorant for domestic and industrial uses. For example, films may be used for fabricating diapers, sanitary bags, bed sheet covers and the like. These films may be provided with perforations by punching or electric discharge. Foamed products may be used as a deodorant to be placed in refrigerators, cars, toilets and the like. Fabrics made from fibers containing the deodorant composition may find the same use as films.

The following examples are further illustrative of the invention.

EXAMPLE 1

100 g of zinc chloride (reagent grade) was dissolved in 500 ml of water. The solution was neutralized with aqueous ammonia (five fold dilution of 28% ammonia) to pH 7.0 with stirring. The resulting white precipitate was suction filtered, washed with 2 liter of hot water, and then heated at 200° C. for 16 hours. The product showed the pattern of a zinc oxide-hydroxide complex by X-ray diffraction.

EXAMPLES 2-3

The process of Example 1 was repeated except that the heat teatment of zinc hydroxide was carried out at 300° C. (Example 2), and 400° C. (Example 3), respectively.

The products showed the same X-ray diffraction pattern as the product of Example 1.

EXAMPLE 4

100 g of zinc sulfate (reagent grade) was dissolved in 500 ml of water. The solution was neutralized with the diluted aqueous ammonia to pH 6.8 with stirring. The resulting white precipitate was suction filtered, washed with 1 liter of hot water, and then heated at 300° C. for 16 hours. The product showed the same X-ray diffraction pattern as the product of Example 1.

EXAMPLE 5

The process of Example 4 was repeated except that 5N aqueous solution of sodium hydroxide was used for neutralization. The product showed the same X-ray diffraction pattern as the product of Example 1.

EXAMPLE 6

The process of Example 4 was repeated except that the precipitate was directly heat treated without washing. The product showed the same X-ray diffraction pattern as the product of Example 1.

EXAMPLE 7

The process of Example 1 was repeated except that the precipitate of zinc hydroxide was heated at 70° C. for 16 hours. The product was identified as zinc hydroxide by its X-ray diffraction pattern.

EXAMPLE 8

The process of Example 1 was repeated except that the precipitate of zinc hydroxide was heated at 500° C. for 16 hours. The product was identified as zinc oxide by its X-ray diffraction pattern.

EXAMPLE 9

The zinc hydroxide produced in Example 7 and the zinc oxide produced in Example 8 were mixed together at a weight ratio of 1:1 in a ball mill.

DETERMINATION OF SPECIC SURFACE AREA

The products of Examples 1 through 9 were tested for their specific surface areas using SHIMADZU MICROMERITICS FLOW SORB Model II 2300 (Shimadzu Corporation, Kyoto, Japan). 0.2 g of each sample was placed in a cell. The cell containing the sample was chilled to the liquid nitrogen temperature while introducing a nitrogen-helium mixed gas having a constant proportion into the cell to physically adsorb the nitrogen gas onto the surfaces of the sample. The change in the proportion of the mixed gas was detected using a TCD detector and corelated to the date on a standard sample having a known specific surface area. The results obtained are as follows.

| Product | Specific Surface Area ($m^2/g$) |
| --- | --- |
| Example 1 | 15.02 |
| Example 2 | 13.53 |
| Example 3 | 11.98 |
| Example 4 | 13.75 |
| Example 5 | 12.84 |
| Example 6 | 14.12 |
| Example 7 | 1.65 |
| Example 8 | 3.43 |
| Example 9 | 2.69 |

HYDROGEN SULFIDE ADSORPTION TEST

The products of Examples 1 through 9 were tested for their capability of adsorbing hydrogen sulfide gas.

1.0 g of each sample was placed in a plastic bag. The bag was inflated with 3 liters of a standard $H_2S$ gas (102 ppm of $H_2S$ in $N_2$ gas, sold by Seitetsu Kagaku Co., Ltd.), sealed and placed at room temperature. The change in $H_2S$ concentration in the gas was measured with time using Kitagawa's gas sensor tube of Model hydrogen sulfide SB (detection limit 0.3 ppm). Percents adsorption were calculated by the following equation.

$$\text{Percent adsorption} = \frac{102 - \text{measured value (ppm)}}{102} \times 100$$

At the same time, organoleptic tests of the treated gases were performed for the odor of $H_2S$. The results obtained are shown in Table I below.

TABLE I

| | Adsorption of $H_2S$ and Organoleptic Test | | |
|---|---|---|---|
| | Time (minute) | | |
| Sample | 5 | 10 | 30 |
| Ex. 1 | >99.7 + | 100 ± | 100 − |
| Ex. 2 | >99.7 + | 100 ± | 100 − |
| Ex. 3 | >99.7 + | 100 − | 100 − |
| Ex. 4 | >99.7 + | 100 ± | 100 − |
| Ex. 5 | 90.0 ++ | 100 ± | 100 − |
| Ex. 6 | 91.0 ++ | 99 + | 100 − |
| Ex. 7 | 25 ++ | 35 + | 65 ++ |
| Ex. 8 | 40 ++ | 75 ++ | 98 ++ |
| Ex. 9 | 30 ++ | 50 ++ | 75 ++ |
| Activated Carbon | 31 ++ | 60 ++ | 90 ++ |

Schedule of Organoleptic Test of $H_2S$:
++: Considerably strong odor
+: Strong odor
±: Slight odor
−: Substantially no odor Methylmercaptan Adsorption Test A similar test was performed for the adsorption of methylmercaptan by the products of Example 2 in comparison with activated carbon. The standard gas used in this test contained 12.1 ppm of methylmercaptan in $N_2$ gas and the gas sensor was Kitagawa's gas sensor tube of Model methylmercaptan S (detection limit 1 ppm). The residual concentrations of methylmercaptan in the treated gases were measured against time. The results obtained are shown in Table II below.

TABLE II

| | Adsorption of Methylmercaptan | | |
|---|---|---|---|
| | Time (minute) | | |
| Sample | 5 | 10 | 30 |
| Ex. 2 | 2 ppm | <1 ppm | <1 ppm |
| Activated Carbon | 2 ppm | <1 ppm | <1 ppm |

As shown in Table II, the zinc oxide-hydroxide complex of the present invention is also effective for adsorbing methylmercaptan which is a typical malodorous gas.

EXAMPLE 10

The zinc oxide-hydroxide complex of Example 2 was blended with aluminum dihydrogen tripolyphosphate (K-FRESH #100P, sold by TAYCA CORPORATION) at varying proportions.

A plastic bag containing 1.0 g of each sample was inflated with 1.5 liters of a standard $NH_3$ gas (170 ppm of $NH_3$ in $N_2$ gas) and 1.5 liters of a standard $H_2S$ gas (204 ppm of $H_2S$ in $N_2$ gas) successively, sealed and placed at room temperature. The change of $NH_3$ and $H_2S$ concentrations in the gas was measured with time using Kitagawa's gas sensor tube and the length of time at which the levels of $NH_3$ and $H_2S$ decreased below their detection limits respectively.

The results obtained are shown in Table III below.

TABLE III

| | Adsorption of $NH_3$ and $H_2S$ | | | |
|---|---|---|---|---|
| Run No. | Aluminum Dihydrogen Tripolyphosphate (wt. %) | Zn(OH)$_2$/ZnO Complex (wt. %) | Adsorption time (minute) | |
| | | | $NH_3$ | $H_2S$ |
| 1 | 100 | — | 1.0 | — |
| 2 | 75 | 25 | 1.0 | 10 |
| 3 | 50 | 50 | 2.0 | 5.0 |
| 4 | 25 | 75 | 2.0 | 5.0 |
| 5 | — | 100 | — | 3.0 |
| 6 | 25 | 75 (ZnO of Ex. 8) | 2.0 | 30 |

EXAMPLE 11

Samples of Run No. 1 through No. 6 of Example 10 were incorporated to polyethylene fiber and tested for the adsorption of $NH_3$ and $H_2S$.

30 g of the sample and 1000 g of low-density polyethylene resin (SUMIKASEN F101-1, Sumitomo Chemical Company Limited) were thoroughly mixed in a single axis extruder at 200° C., extruded through a 300 mesh wire screen, and then spun into fibers through an orifice having a diameter of about 10 microns. 30 g of the fibers was taken and tested for the adsorption of $NH_3$ and $H_2S$ as in Example 10. The results obtained are shown in Table IV.

TABLE IV

| | Adsorption of $NH_3$ and $H_2S$ | |
|---|---|---|
| | Adsorption time (hour) | |
| Run No. | $NH_3$ | $H_2S$ |
| 1 | 2.5 | — |
| 2 | 2.5 | 4.0 |
| 3 | 3.0 | 3.0 |
| 4 | 3.5 | 3.0 |
| 5 | — | 2.0 |
| 6 | 3.5 | 20.0 |

EXAMPLE 12

The process of Example 11 was repeated except that the matrix resin was polyethylenterephthalate (NOVATOL 5008, Mitsubishi Kasei Corporation) and the extrusion temperature was 260° C. The results obtained are shown in Table V.

TABLE V

| | Adsorption of $NH_3$ and $H_2S$ | |
|---|---|---|
| | Adsorption time (hour) | |
| Run No. | $NH_3$ | $H_2S$ |
| 1 | 2.5 | — |
| 2 | 3.0 | 5.0 |
| 3 | 3.0 | 4.0 |
| 4 | 4.0 | 4.0 |
| 5 | — | 2.0 |
| 6 | 4.0 | 20.0 |

EXAMPLE 13

Samples of Run No. 1 through No. 6 of Example 10 were incorporated to polypropylene film and tested for the adsorption of $NH_3$ and $H_2S$.

25 g of the sample and 1000 g of polypropylene resin (MITSUI NOBREN JHHG, Mitsui Toatsu Chemicals, Inc.) were throughly mixed in a single axis extruder at 250° C. and inflation extruded to a film having a thickness of 0.05 mm. 30 g of the resulting film was taken and tested for the adsorption of $NH_3$ and $H_2S$ as in the preceding examples. The results obtained are shown in Table VI.

TABLE VI

| Run No. | Adsorption of NH₃ and H₂S | |
|---|---|---|
| | Adsorption time (hour) | |
| | NH₃ | H₂S |
| 1 | 5.0 | — |
| 2 | 5.0 | 10.0 |
| 3 | 6.0 | 10.0 |
| 4 | 6.0 | 6.0 |
| 5 | — | 5.0 |
| 6 | 6.0 | 50.0 |

EXAMPLE 14

Samples of Run No. 1 through No. 6 of Example 10 were incorporated to polystyrene foam and tested for the adsorption of $NH_3$ and $H_2S$.

50 g of the sample and 1000 g of polystyrene (STYRON #683, Asahi Chemical Industry Co., Ltd.) were thoroughly mixed in a single axis extruder at 180° C. while introducing liquid butane under pressure and extruded through a die to obtain a foamed product having an expansion ratio of 2.0. 5 g of the foamed product was taken and tested for the adsorption of $NH_3$ and $H_2S$ as in the preceding examples. The results are shown in Table VII.

TABLE VII

| Run No. | Adsorption of NH₃ and H₂S | |
|---|---|---|
| | Adsorption time (hour) | |
| | NH₃ | H₂S |
| 1 | 1.0 | — |
| 2 | 1.0 | 3.0 |
| 3 | 1.0 | 2.0 |
| 4 | 1.0 | 2.0 |
| 5 | — | 1.0 |
| 6 | 1.0 | 15.0 |

EXAMPLE 15

Fibers produced in Example 12 were dyed with a disperse dye (Disperse Blue Extra) by the conventional dyeing method. 20 g of the dyed fibers were taken and tested for the adsorption of $NH_3$ and $H_2S$ as in the preceding examples. The results obtained are shown in Table VIII.

TABLE VIII

| Run No. | Adsorption of NH₃ and H₂S | |
|---|---|---|
| | Adsorption time (hour) | |
| | NH₃ | H₂S |
| 1 | 4.0 | — |
| 2 | 5.0 | 10.0 |
| 3 | 5.0 | 10.0 |
| 4 | 6.0 | 8.0 |
| 5 | — | 6.0 |
| 6 | 6.0 | 50.0 |

We claim:

1. A zinc oxide-hydroxide complex produced by the steps of reacting a water-soluble zinc salt with a substantially stoichiometric amount of an alkali metal hydroxide or ammonium hydroxide in an aqueous reaction medium to form zinc hydroxide, recovering and heating the thus produced zinc hydroxide at a temperature from about 200° C. to 400° C. for a length of time sufficient to reach a constant weight, said complex being capable of adsorbing hydrogen sulfide, mercaptans and other malodorous acidic gases and having a specific surface area greater than 10 m²/g.

2. An adsorbent composition for malodorous gases comprising the zinc oxide-hydroxide complex of claim 1 in admixture with aluminum dihydrogen tripolyphosphate in a ratio of between 90:10 and 10:90 by weight.

3. The adsorbent composition according to claim 2 wherein said ratio is between 75:25 and 25:75 by weight.

4. A plastic adsorbent material formed from a synthetic thermoplastic resin containing about 0.5 to about 20% by weight of the resin of the zinc oxide-hydroxide complex of claim 1.

5. A plastic adsorbent material formed from a synthetic thermoplastic resin containing about 0.5 to about 20% by weight of the resin of the adsorbent composition of claim 2.

6. A plastic adsorbent material formed from a synthetic thermoplastic resin containing about 0.5 about 20% by weight of the resin of the adsorbent composition of claim 3.

7. An adsorbent article fabricated from the plastic material of claim 4 in the form of granules, a film, fibers or a foamed product.

8. An adsorbent article fabricated from the plastic material of claim 5 in the form of granules, a film, fibers or a foamed product.

9. An adsorbent article fabricated from the plastic material of claim 6 in the form of granules, a film, fibers or a foamed product.

* * * * *